US007919017B2

(12) United States Patent
Bates et al.

(10) Patent No.: US 7,919,017 B2
(45) Date of Patent: Apr. 5, 2011

(54) ELECTRICAL INSULATION FLUIDS FOR USE IN ELECTRICAL APPARATUS

(75) Inventors: Lisa C. Bates, Chester, VA (US); Hari Babu Sunkara, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 188 days.

(21) Appl. No.: 11/938,701

(22) Filed: Nov. 12, 2007

(65) Prior Publication Data

US 2009/0121200 A1 May 14, 2009

(51) Int. Cl.
*H01B 3/20* (2006.01)
*H01B 3/24* (2006.01)
*C07C 69/66* (2006.01)
*C08G 63/02* (2006.01)

(52) U.S. Cl. ......... 252/570; 252/579; 560/179; 528/272

(58) Field of Classification Search .................. 252/579, 252/570; 528/272; 560/179
See application file for complete search history.

(56) References Cited

U.S. PATENT DOCUMENTS

| | | | | |
|---|---|---|---|---|
| 2,599,803 | A | 6/1952 | Ames et al. | |
| 5,015,789 | A | 5/1991 | Arntz et al. | |
| 5,276,201 | A | 1/1994 | Haas et al. | |
| 5,284,979 | A | 2/1994 | Haas et al. | |
| 5,334,778 | A | 8/1994 | Haas et al. | |
| 5,364,984 | A | 11/1994 | Arntz et al. | |
| 5,364,987 | A | 11/1994 | Haas et al. | |
| 5,633,362 | A | 5/1997 | Nagarajan et al. | |
| 5,686,276 | A | 11/1997 | Laffend et al. | |
| 5,821,092 | A | 10/1998 | Nagarajan et al. | |
| 5,962,745 | A | 10/1999 | Brossmer et al. | |
| 6,140,543 | A | 10/2000 | Brossmer et al. | |
| 6,232,511 | B1 | 5/2001 | Haas et al. | |
| 6,235,948 | B1 | 5/2001 | Sunkara et al. | |
| 6,277,289 | B1 | 8/2001 | Kurian et al. | |
| 6,297,408 | B1 | 10/2001 | Haas et al. | |
| 6,331,264 | B1 | 12/2001 | Kurian et al. | |
| 6,342,646 | B1 | 1/2002 | Haas et al. | |
| 6,720,459 | B2 | 4/2004 | Sunkara et al. | |
| 6,977,291 | B2 | 12/2005 | Sunkara et al. | |
| 7,009,082 | B2 | 3/2006 | Sunkara et al. | |
| 7,038,092 | B2 | 5/2006 | Sunkara et al. | |
| 7,084,311 | B2 | 8/2006 | Sunkara et al. | |
| 7,098,368 | B2 | 8/2006 | Seapan et al. | |
| 2004/0030095 | A1 | 2/2004 | Sunkara et al. | |
| 2005/0020805 | A1 | 1/2005 | Sunkara et al. | |
| 2005/0069997 | A1 | 3/2005 | Adkesson et al. | |
| 2006/0192185 | A1* | 8/2006 | Sunkara et al. | 252/579 |
| 2008/0108845 | A1* | 5/2008 | Sunkara et al. | 560/129 |

FOREIGN PATENT DOCUMENTS

| | | |
|---|---|---|
| JP | 2004-182974 | 7/2004 |
| WO | 2008057462 A | 5/2008 |

OTHER PUBLICATIONS

U.S. Appl. No. 11/593,954, filed Nov. 7, 2006, Hari Babu Sunkara et al.

J. Buffle et al., Source Apportionment of Atmospheric Particles, IUPAC Environmental Analytical Chemistry Series, 1992, vol. 1:3-74.

Y. Hsieh, Division S-3-Soil Microbiology & Biochemistry, Soil Sci. Soc. Am. J., 1992, vol. 56:460-464.

Weber et al., C-Pattern of Natural Glycerol: Origin and Practical Importance, J. Agric. Food Chem., 1997, vol. 45:2042-2046.

International Search Report, PCT International Application PCT/US2008/83078, May 22, 2009.

* cited by examiner

*Primary Examiner* — Ling-Siu Choi
*Assistant Examiner* — Monique Peets
(74) *Attorney, Agent, or Firm* — Gail D. Tanzer

(57) ABSTRACT

Insulation fluids comprising polytrimethylene ether glycol esters are provided. The insulation fluids can be used in electrical apparatuses.

12 Claims, No Drawings

ELECTRICAL INSULATION FLUIDS FOR USE IN ELECTRICAL APPARATUS

FIELD OF THE INVENTION

This invention relates to electrical insulation fluids (also called dielectric coolants) comprising polytrimethylene ether glycol esters and at least one additive. Also provided are electrical apparatuses containing the fluids.

BACKGROUND

The components that are used to generate and transfer electrical energy to end users are well known in the art. Electrical power producers generally generate electrical power at very high initial voltages. Handling of such high voltages requires substantial electrical insulation. The insulation requires control of heat that is generated from the transmission of the electrical energy and maintenance of its dielectric properties.

The primary purpose of the types of fluids used in electrical transformers and fluid-filled transmission lines, hereinafter referred to as electrical insulating fluid or dielectric coolants, is to maintain cooling properties and fluid characteristics while in use within the system so as to maintain appropriate temperature as well as dielectric strength on demand. The heat of the transformer unit, for example, can increase to high levels for extended periods of time, which the fluid must be able to tolerate the heat without deterioration of properties. Additionally, the operation of transformers and the process of heat dissipation at various ambient temperatures subject the fluid to constant stresses.

It has been found that certain fluids have high electrical insulating and heat dissipation properties. These fluids are used with such electrical components as transformers and fluid filled transmission lines. One particular problem, even with such fluids, is that over time and with substantial exposure to high voltage electricity, their beneficial characteristics, such as insulating and/or heat dissipation properties, can degrade.

The industry uses a variety of insulating fluids which are easily available and cost effective. Examples are mineral oil, silicone fluid and synthetic hydrocarbon oils used in transformers, power cables and capacitors. Such fluids have certain properties that allow them to function satisfactorily, including that they are electrically insulating and dissipate heat, and resist break-down. However, some commonly used fluids pose safety or contamination concerns, and can be toxic to humans and animals. Many electrical components holding such fluids are situated near water or waterways where leakage or spills can cause serious damage to water and marine life. Leaks or spills on land can threaten ground water and contaminate soil.

Most conventional fluids are petroleum based and thus are derived from non-renewable starting materials. The amount of fluid of this type in use is significant. For example, one 15 MVA transformer (serving approximately 2000 customers, both residential and commercial) requires on the order of 3,600 gallons of electrically insulating fluid. One mile of fluid filled transmission cable (6 inch diameter) requires about 7,000 gallons. There are approximately 20,000 miles of high-pressure fluid filled transmission cables in the United States, most in larger cities and therefore near water or waterways.

Significant amounts of resources, both time and money, are spent by electrical power companies, in designing and implementing plans and systems to deter leaks or spills and to monitor transformers and transmission cables of these types for leaks or spills. It is estimated such costs are in the millions of dollars in the United States alone. Additionally, substantial resources are expended in reporting leaks or spills, even minor ones, because of environmental rules and regulations, at least with regard to petroleum based fluids. The effect of leaks or spills can be very costly, as can remediation of the same.

Therefore, there have been attempts to look to new sources for such fluids. It is desirable, with regard to such new sources, to address the environmental concerns as well as the issue of renewability of source.

Among the properties that are desirable for useful and efficient electrical insulation fluids are high dielectric breakdown voltage, low dissipation factor, high specific heat, high thermal conductivity, low coefficient of expansion, low viscosity, low sensitivity of viscosity to temperature, low pour point temperatures, low volatility, high flash point and low moisture. The electrical insulation fluids of the present invention possess a wide variety of these desirable properties.

Another demand placed upon electrical insulation fluids is that they maintain a certain degree of stability in terms of insulating properties despite some of the physical and chemical changes that take place during extended use.

Co-owned US Patent Application Publication 2006/0192185 describes electrical apparatuses and a method for their production, the apparatuses containing electrical insulation fluids comprising polytrimethylene homo- or copolyether glycol having a dielectric breakdown voltage greater than about 30 kV, wherein from about 50 to 100 mole percent of the repeating units of the polytrimethylene homo- or copolyether glycol are trimethylene ether units.

SUMMARY OF THE INVENTION

This invention relates to an electrical apparatus comprising an electrical insulation fluid that comprises polytrimethylene ether glycol esters having a dielectric breakdown voltage equal to or greater than about 30 kV, wherein from about 50 to 100 mole percent of the repeating units of the polytrimethylene ether glycol esters are trimethylene ether units and 50 to 100 percent chain ends are esters The invention also relates to a method of producing an electrical apparatus containing an electrical insulation fluid comprising: (a) providing at least one electrical insulation fluid comprising polytrimethylene ether glycol esters having a dielectric breakdown voltage equal or greater than about 30 kV, wherein from about 50 to 100 mole percent of the repeating units of the polytrimethylene ether glycol esters are trimethylene ether units, (b) combining the electrical insulation fluid with an antioxidant and at least one additive selected from the group of thermal stabilizers, corrosive inhibitors, and lubricity enhancing agents; and (c) placing the fluid into the electrical apparatus.

The invention is further directed to an electrical insulation fluid comprising (a) polytrimethylene ether glycol esters having trimethylene ether units as about 50 to 100 mole percent of the repeating units and (b) blending component selected from the group consisting of vegetable oils, mineral oil, poly alpha olefins, synthetic esters and mixtures thereof, wherein the electrical insulation fluid has a dielectric breakdown voltage of equal or greater than about 30 kV.

The electrical apparatus of the invention is preferably selected from the group consisting of electrical transformers, capacitors, fluid-filled transmission lines and fluid-filled power cables.

In a particularly preferred embodiment, polytrimethylene ether glycol esters are produced from ingredients comprising 1,3-propanediol derived from a fermentation process using a renewable biological source.

Preferably, the electrical insulation fluid has flash and fire points greater than about 150° C., a kinematic viscosity at 4° C. of below about 100 centistokes (cSt) and a thermal conductivity of from about 0.10 to 0.20 watts/m 0K at about 38° C. (100° F.).

Preferably, the electrical insulation fluid comprises from about 75 wt. % to 100 wt. % polytrimethylene ether glycol esters. The electrical insulation fluid may further comprise a blending component. Preferably the blending component is selected from the group consisting of vegetable oil, mineral oil, poly alpha olefins, synthetic esters and mixtures thereof.

In one preferred embodiment, the electrical insulation fluid comprises (a) from about 50 wt. % to about 99 wt. % polytrimethylene ether glycol esters, (b) from about 1 to about 50 wt. % of the blending component, both by weight of the electrical insulation fluid.

The electrical insulation fluid may further comprise at least one additive selected from the group consisting of oxidation inhibitors, corrosion inhibitors, metal deactivators, and heat stabilizer. Preferably the oxidation inhibitor comprises at least one compound selected from the group consisting of hindered phenols, phenolic esters, alkylated diphenylamines and mixtures thereof.

DETAILED DESCRIPTION

Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In one embodiment the invention is directed to an electrical apparatus comprising an electrical insulation fluid that comprises polytrimethylene ether glycol esters having a dielectric breakdown voltage equal or greater than about 30 Kv.

The dielectric fluid compositions disclosed herein preferably comprise 70, 80 or 90 percent or more by weight of the polytrimethylene ether glycol esters (PO3G esters). These esters are derived from 1,3-propanediol, preferably from a renewable source.

The PO3G esters comprise one or more compounds of the formula (I):

(I)

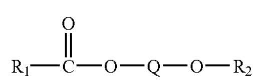

wherein Q represents the residue of a polytrimethylene ether glycol after abstraction of the hydroxyl groups, R2 is H or R3CO, and each of R1 and R3 is individually a substituted or unsubstituted aromatic, saturated aliphatic, unsaturated aliphatic or cycloaliphatic hydrocarbon group, containing from 6 to 40 carbon atoms, e.g., at least about 6, 8 or 10 carbon atoms, up to about 25, 30, or 4° carbon atoms.

PO3G esters are preferably prepared by polycondensation of hydroxyl groups-containing monomers (monomers containing 2 or more hydroxyl groups) comprising predominantly, e.g., at least about 50%, 1,3-propanediol, to form a PO3G (as disclosed in further detail below), followed by esterification with a monocarboxylic acid (or equivalent), as disclosed in U.S. application Ser. No. 11/593,954, filed Nov. 7, 2006, entitled "POLYTRIMETHYLENE ETHER GLYCOL ESTERS".

The PO3G ester thus prepared is a composition preferably comprising from about 50 to 100 wt %, more preferably from about 75 to 100 wt %, diester and from 0 to about 50 wt %, more preferably from 0 to about 25 wt %, monoester, based on the total weight of the esters. Preferably the mono- and diesters are esters of 2-ethylhexanoic acid.

Polytrimethylene Ether Glycol (PO3G)

PO3G as used herein is a polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, preferably in the presence of an acid catalyst, thus resulting in polymers or copolymers containing —(CH2CH2CH2O)— linkage (e.g, trimethylene ether repeating units). As indicated above, at least 50% of the repeating units are trimethylene ether units.

In addition to the trimethylene ether units, lesser amounts of other units, such as other polyalkylene ether repeating units, may be present. In the context of this disclosure, the term "polytrimethylene ether glycol" encompasses PO3G made from substantially pure 1,3-propanediol, e.g., at least about 85, preferably at least about 90, more preferably at least about 95, and even more preferably at least about 99 mole percent 1,3-propanediol, as well as those oligomers and polymers (including those described below) containing up to about 50% by weight of comonomers.

The 1,3-propanediol employed for preparing the PO3G may be obtained by any of the various well known chemical routes or by biochemical transformation routes. Preparation routes are described in, for example, U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,633,362, U.S. Pat. No. 5,686,276, U.S. Pat. No. 5,821,092, U.S. Pat. No. 5,962,745, U.S. Pat. No. 6,140,543, U.S. Pat. No. 6,232,511, U.S. Pat. No. 6,235,948, U.S. Pat. No. 6,277,289, U.S. Pat. No. 6,297,408, U.S. Pat. No. 6,331,264, U.S. Pat. No. 6,342,646, U.S. Pat. No. 7,038,092, U.S. Pat. No. 7,084,311, U.S. Pat. No. 7,098,368, U.S. Pat. No. 7,009,082 and US20050069997A1.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species Klebsiella, Citrobacter, Clostridium, and Lactobacillus. The technique is disclosed in several publications, including U.S. Pat. No. 5,633,362, U.S. Pat. No. 5,686,276 and U.S. Pat. No. 5,821,092. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in the cited publications can provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the preferred biologically-derived 1,3-propanediol contains only renewable carbon, and not fossil fuel-based or petroleum-based carbon. The PO3G and esters thereof utilizing the biologically-derived 1,3-propanediol, therefore, can have less impact on the environment than those from conventional sources, as the biologically derived 1,3-propanediol used in the compositions does not deplete diminishing fossil fuels and, upon degradation, releases carbon back to the atmosphere for use by plants once again. Thus, the compositions disclosed herein can be characterized as more natural and having less environmental impact than conventional compositions comprising petroleum based glycols.

The biologically-derived 1,3-propanediol, PO3G and PO3G esters, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes 14C and 13C bring complementary information to this problem. The radiocarbon dating isotope (14C), with its nuclear half life of 5,730 years, clearly allows one to apportion specimen carbon between fossil ("dead") and biospheric ("alive") feedstocks (Currie, L. A. "Source Apportionment of Atmospheric Particles," Characterization of Environmental Particles, J. Buffle and H. P. van Leeuwen, Edition I, Vol. 1, of the IUPAC Environmental Analytical Chemistry Series (Lewis Publishers, Inc) (1992) 3-74). The basic assumption in radiocarbon dating is that the constancy of 14C concentration in the atmosphere leads to the constancy of 14C in living organisms. When dealing with an isolated sample, the age of a sample can be deduced approximately by the relationship:

$$t=(-5730/0.693)\ln(A/A0)$$

wherein t=age, 5730 years is the half-life of radiocarbon, and A and A0 are the specific 14C activity of the sample and of the modern standard, respectively (Hsieh, Y., Soil Sci. Soc. Am J., 56, 460, (1992)). However, because of atmospheric nuclear testing since 1950 and the burning of fossil fuel since 1850, 14C has acquired a second, geochemical time characteristic. Its concentration in atmospheric CO2, and hence in the living biosphere, approximately doubled at the peak of nuclear testing, in the mid-1960s. It has since been gradually returning to the steady-state cosmogenic (atmospheric) baseline isotope rate (14C/12C) of ca. 1.2×10=12, with an approximate relaxation "half-life" of 7-10 years. (This latter half-life must not be taken literally; rather, one must use the detailed atmospheric nuclear input/decay function to trace the variation of atmospheric and biospheric 14C since the onset of the nuclear age.) It is this latter biospheric 14C time characteristic that holds out the promise of annual dating of recent biospheric carbon. 14C can be measured by accelerator mass spectrometry (AMS), with results given in units of "fraction of modern carbon" (fM). fM is defined by National Institute of Standards and Technology (NIST) Standard Reference Materials (SRMs) 4990B and 4990C, known as oxalic acids standards HOxI and HOxII, respectively. The fundamental definition relates to 0.95 times the 14C/12C isotope ratio HOxI (referenced to AD 1950). This is roughly equivalent to decay-corrected pre-Industrial Revolution wood. For the current, living biosphere, plant material, fM≈1.1.

The stable carbon isotope ratio (13C/12C) provides a complementary route to source discrimination and apportionment. The 13C/12C ratio in a given biosourced material is a consequence of the 13C/12C ratio in atmospheric carbon dioxide at the time the carbon dioxide is fixed and also reflects the precise metabolic pathway. Regional variations also occur. Petroleum, C3 plants (the broadleaf), C4 plants (the grasses), and marine carbonates all show significant differences in 13C/12C and the corresponding δ 13C values. Furthermore, lipid matter of C3 and C4 plants analyze differently than materials derived from the carbohydrate components of the same plants as a consequence of the metabolic pathway. Within the precision of measurement, 13C shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric CO2. Two large classes of vegetation are those that incorporate the "C3" (or Calvin-Benson) photosynthetic cycle and those that incorporate the "C4" (or Hatch-Slack) photosynthetic cycle. C3 plants, such as hardwoods and conifers, are dominant in the temperate climate zones. In C3 plants, the primary CO2 fixation or carboxylation reaction involves the enzyme ribulose-1,5-diphosphate carboxylase and the first stable product is a 3-carbon compound. C4 plants, on the other hand, include such plants as tropical grasses, corn and sugar cane. In C4 plants, an additional carboxylation reaction involving another enzyme, phosphenol-pyruvate carboxylase, is the primary carboxylation reaction. The first stable carbon compound is a 4-carbon acid, which is subsequently decarboxylated. The CO2 thus released is refixed by the C3 cycle.

Both C4 and C3 plants exhibit a range of 13C/12C isotopic ratios, but typical values are ca. −10 to −14 per mil (C4) and −21 to −26 per mil (C3) (Weber et al., J. Agric. Food Chem., 45, 2942 (1997)). Coal and petroleum fall generally in this latter range. The 13C measurement scale was originally defined by a zero set by pee dee belemnite (PDB) limestone, where values are given in parts per thousand deviations from this material. The "δ13C" values are in parts per thousand (per mil), abbreviated %, and are calculated as follows:

$$\delta 13C \equiv \frac{(13C/12C)sample-(13C/12C)standard}{(13C/12C)standard}\times 1000\%$$

Since the PDB reference material (RM) has been exhausted, a series of alternative RMs have been developed in cooperation with the IAEA, USGS, NIST, and other selected international isotope laboratories. Notations for the per mil deviations from PDB is δ13C. Measurements are made on CO2 by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of 14C (fM) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, U.S. Pat. No. 7,098,368, U.S. Pat. No. 7,084,311 and US20050069997A1, as well as PO3G made therefrom as disclosed in US20050020805A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having CIELAB *b* color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

PO3G can be made via a number of processes known in the art, such as disclosed in U.S. Pat. No. 6,977,291 and U.S. Pat. No. 6,720,459. As indicated above, PO3G may contain lesser amounts of other polyalkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, C6-C10 diols (such as 1,6-hexanediol, 1,8-octanediol and 1,10-decanediol) and isosorbide, and mixtures thereof. A particularly preferred diol other than 1,3-propanediol is ethylene glycol, and C6-C10 diols can be particularly useful as well.

One preferred PO3G containing comonomers is poly(trimethylene-ethylene ether) glycol such as described in US20040030095A1. Preferred poly(trimethylene-ethylene ether) glycols are prepared by acid catalyzed polycondensation of from 50 to about 99 mole % (preferably from about 60 to about 98 mole %, and more preferably from about 70 to about 98 mole %) 1,3-propanediol and up to 50 to about 1 mole % (preferably from about 40 to about 2 mole %, and more preferably from about 30 to about 2 mole %) ethylene glycol.

Preferably, the PO3G after purification has essentially no acid catalyst end groups, but may contain very low levels of unsaturated end groups, predominately allyl end groups, in the range of, from about 0.003, to about 0.03 meq/g. Such a PO3G can be considered to comprise (consist essentially of) the compounds having the following formulae (II) and (III):

$$HO—((CH_2)_3O)_m\text{-}H \quad (II)$$

$$HO—((CH_2)_3\text{-}O)_mCH_2CH{=}CH_2 \quad (III)$$

wherein m is in a range such that the Mn (number average molecular weight) is within the range of from about 200 to about 10000, with compounds of formula (III) being present in an amount such that the allyl end groups (preferably all unsaturation ends or end groups) are present in the range of from about 0.003 to about 0.03 meq/g.

The preferred PO3G for use in the invention has an Mn (number average molecular weight) of at least about 150, more preferably at least about 500, and still more preferably at least about 1000. The Mn is preferably less than about 10000, more preferably less than about 5000, and still more preferably less than about 2500. Blends of PO3Gs can also be used. For example, the PO3G can comprise a blend of a higher and a lower molecular weight PO3G, preferably wherein the higher molecular weight PO3G has a number average molecular weight of from about 1000 to about 5000, and the lower molecular weight PO3G has a number average molecular weight of from about 200 to about 950. The Mn of the blended PO3G will preferably still be in the ranges mentioned above.

PO3G preferred for use herein is typically polydisperse having a polydispersity (i.e. Mw/Mn) of preferably from about 1.0 to about 2.2, more preferably from about 1.2 to about 2.2, and still more preferably from about 1.5 to about 2.1. The polydispersity can be adjusted by using blends of PO3G.

PO3G for use herein preferably has a color value of less than about 100 APHA, and more preferably less than about 50 APHA, and a viscosity preferably less than 250 cSt at 40° C.

Acid and Equivalents

The esterification of the PO3G is carried out by reaction with an acid and/or equivalent, preferably a monocarboxylic acid and/or equivalent.

By "monocarboxylic acid equivalent" is meant compounds that perform substantially like monocarboxylic acids in reaction with polymeric glycols and diols, as would be generally recognized by a person of ordinary skill in the relevant art. Monocarboxylic acid equivalents for the purpose of the present invention include, for example, esters of monocarboxylic acids, and ester-forming derivatives such as acid halides (e.g., acid chlorides) and anhydrides.

Preferably, a monocarboxylic acid is used having the formula R—COOH, wherein R is a substituted or unsubstituted aromatic, aliphatic or cycloaliphatic organic moiety containing from 6 to 40 carbon atoms.

Mixtures of different monocarboxylic acids and/or equivalents are also suitable.

As indicated above, the monocarboxylic acid (or equivalent) can be aromatic, aliphatic or cycloaliphatic. In this regard, "aromatic" monocarboxylic acids are monocarboxylic acids in which a carboxyl group is attached to a carbon atom in a benzene ring system such as those mentioned below. "Aliphatic" monocarboxylic acids are monocarboxylic acids in which a carboxyl group is attached to a fully saturated carbon atom or to a carbon atom which is part of an olefinic double bond. If the carbon atom is in a ring, the equivalent is "cycloaliphatic."

The monocarboxylic acid (or equivalent) can contain any substituent groups or combinations thereof (such as functional groups like amide, amine, carbonyl, halide, hydroxyl, etc.), so long as the substituent groups do not interfere with the esterification reaction or adversely affect the properties of the resulting ester product.

The monocarboxylic acids and equivalents can be from any source, but preferably are derived from natural sources or are bio-derived.

The following acids and their derivatives are specifically preferred: lauric, myristic, palmitic, stearic, arachidic, benzoic, caprylic, erucic, palmitoleic, pentadecanoic, heptadecanoic, nonadecanoic, linoleic, arachidonic, oleic, valeric, caproic, capric and 2-ethylhexanoic acids, and mixtures thereof. Particularly preferred acids or derivatives thereof are 2-ethylhexanoic acid, benzoic acid, stearic acid, lauric acid and oleic acid.

Esterification Process

For preparation of the esters, the PO3G can be contacted, preferably in the presence of an inert gas such as, for example, nitrogen or argon, with the monocarboxylic acid(s) at temperatures ranging from about 100° C. to about 275° C., preferably from about 125° C. to about 250° C. The process can be carried out at atmospheric pressure or under vacuum. During the contacting, water is formed and can be removed in the inert gas stream or under vacuum to drive the reaction to completion.

To facilitate the reaction of PO3G with carboxylic acid an esterfication catalyst is generally used, preferably a mineral acid catalyst. Examples of mineral acid catalysts include but are not restricted to sulfuric acid, hydrochloric acid, phosphoric acid, hydriodic acid, and heterogeneous catalysts such as zeolites, heteropolyacid, amberlyst, and ion exchange resin. Preferred esterification acid catalysts are selected from the group consisting of sulfuric acid, phosphoric acid, hydrochloric acid and hydroiodic acid. A particularly preferred mineral acid catalyst is sulfuric acid.

The amount of catalyst used can be from about 0.01 wt % to about 10 wt % of the reaction mixture, preferably from 0.1 wt % to about 5 wt %, and more preferably from about 0.2 wt % to about 2 wt %, of the reaction mixture.

Any ratio of carboxylic acid, or derivatives thereof, to glycol hydroxyl groups can be used. The preferred ratio of acid to hydroxyl groups is from about 3:1 to about 1:2, where the ratio can be adjusted to shift the ratio of monoester to diester in the product. Generally to favor production of diesters slightly more than a 1:1 ratio is used. To favor production of monoesters, a 0.5:1 ratio or less of acid to hydroxyl is used.

A preferred method for esterification comprises polycondensing 1,3-propanediol reactant to polytrimethylene ether glycol using a mineral acid catalyst, then adding carboxylic acid and carrying out the esterification without isolating and purifying the PO3G. In this method, the etherification or polycondensation of 1,3-propanediol reactant to form polytrimethylene ether glycol is carried out using an acid catalyst as disclosed in U.S. Pat. No. 6,977,291 and U.S. Pat. No. 6,720,459. The etherification reaction may also be carried out using a polycondensation catalyst that contains both an acid and a base as described in JP2004-182974A. The polycondensation or etherification reaction is continued until desired molecular weight is reached, and then the calculated amount of monocarboxylic acid is added to the reaction mixture. The reaction is continued while the water byproduct is removed. At this stage both esterification and etherification reactions occur simultaneously. Thus, in this preferred esterification method the acid catalyst used for polycondensation of diol is also used for esterification. If necessary, additional esterification catalyst can be added at the esterification stage.

In this procedure, the viscosity (molecular weight) of the resulting product is controlled by the point at which the carboxylic acid is added.

In an alternative procedure, the esterification reaction can be carried out on purified PO3G by addition of an esterification catalyst and carboxylic acid followed by heating and removal of water. In this procedure, viscosity of the resulting product is predominantly a function of the molecular weight of the PO3G utilized.

Regardless of which esterification procedure is followed, after the esterification step any by products are removed, and then the catalyst residues remaining from polycondensation and/or esterification are removed in order to obtain an ester product that is stable, particularly at high temperatures. This may be accomplished by hydrolysis of the crude ester product by treatment with water at about 80° C. to about 100° C. for a time sufficient to hydrolyze any residual acid esters derived from the catalyst without impacting significantly the carboxylic acid esters. The time required can vary from about 1 to about 8 hours. If the hydrolysis is carried out under pressure, higher temperatures and correspondingly shorter times are possible. At this point the product may contain diesters, monoesters, or a combination of diesters and monoesters, and small amounts of acid catalyst, unreacted carboxylic acid and diol depending on the reaction conditions. The hydrolyzed polymer is further purified to remove water, acid catalyst and unreacted carboxylic acid by the known conventional techniques such as water washings, base neutralization, filtration and/or distillation. Unreacted diol and acid catalyst can, for example, be removed by washing with deionized water. Unreacted carboxylic acid also can be removed, for example, by washing with deionized water or aqueous base solutions, or by vacuum stripping.

Hydrolysis is generally followed by one or more water washing steps to remove acid catalyst, and drying, preferably under vacuum, to obtain the ester product. The water washing also serves to remove unreacted diol. Any unreacted monocarboxylic acid present may also be removed in the water washing, but may also be removed by washing with aqueous base or by vacuum stripping.

The product can be fractionated further to isolate polytrimethylene ether glycols having lower viscosity by a fractional distillation under reduced pressure.

Proton NMR and wavelength X-ray fluorescence spectroscopic methods can be used to identify and quantify any residual catalyst (such as sulfur) present in the polymer. The proton NMR can, for example, identify the sulfate ester groups present in the polymer chain, and wavelength x-ray fluorescence method can determine the total sulfur (inorganic and organic sulfur) present in the polymer. The esters of the invention made from the process described above are substantially sulfur free and thus useful for high temperature applications.

Preferably, the PO3G esters after purification have essentially no acid catalyst end groups, but may contain very low levels of unsaturated end groups, predominately allyl end groups, in the range of, from about 0.003, to about 0.03 meq/g. Such PO3G ester can be considered to comprise (consist essentially of) the compounds having the following formulae (IV) and (V):

R1-C(O)—O—((CH2)3O)*m*-R2 (IV)

R1-C(O)—O—((CH2)3-O)*m*CH2CH═CH2 (V)

wherein R2 is H or R3C(O); each of R1 and R3 is individually a substituted or unsubstituted aromatic, saturated aliphatic, unsaturated aliphatic, or cycloaliphatic organic group containing from 6 to 40 carbon atoms; m is in a range such that the Mn is within the range of from about 200 to about 3000; and with compounds of formula (III) being present in an amount such that the allyl end groups (preferably all unsaturation ends or end groups) are present in the range of from about 0.003 to about 0.03 meq/g.

Preferably, the PO3G ester has a viscosity less than the viscosity of PO3G (when utilized). Preferred viscosities of PO3G esters range from about 5 cSt to about 150 cSt at 40° C., and more preferably are about 100 cSt or less.

Other preferred properties of the PO3G esters depend upon the preferences stated above for PO3G. For example, preferred molecular weights and polydispersities are based on the preferred molecular weights and polydispersities of the PO3G component of the ester.

Electrical insulation fluids, also known as dielectric coolants, generally perform two major functions. First, they serve as electrical insulation to withstand the high voltages present in a particular electrical apparatus in which they are used by being placed within the apparatus. Typical of the electrical apparatuses that use insulation fluids are electrical transformers, capacitors and fluid-filled transmission lines or power cables. Second, they function as to dissipate heat generated within the apparatus. Thus these fluids must maintain good electrical properties while at the same time resisting thermal oxidation and degradation.

For example, electrical insulation fluids as disclosed herein preferably have kinematic viscosities at 40° C. of below about 100 centistokes (cSt). Dielectric breakdown voltage is a measure of a fluid's ability to resist electrical breakdown at a power frequency of 60 Hz, and is measured as the minimum voltage required for causing arcing between two electrodes submerged in the fluid. It has been observed that the dielectric breakdown voltage of the electrical insulation fluids disclosed herein is equal or greater than about 30 kV, the value that has been reported for mineral oil. The dielectric strength of insulating fluids can be reduced if there is water present in the fluid. The esters used herein are generally hydrophobic and have surface tension below 40 dynes/cm, and do not absorb water from the air or other materials with which they have contact. Therefore, little to no reduction in their dielectric strength is noted.

Other significant properties possessed by the electrical insulation fluids disclosed herein are pour points preferably below about 0° C., more preferably below −20° C., and even more preferably below −30° C., flash and fire points preferably above about 150° C. Flash point assesses the overall flammability of the fluid and determines the presence of volatile or flammable material at elevated temperature; whereas the fire point determines the temperature at which the fluid would support combustion. This combination of properties ensures that the fluids of the invention can function satisfactorily as electrical insulation fluids at temperatures at least as low as about −70° C., and at least as high as about 200° C.

In preferred embodiments, the electrical insulation fluid comprises from about 75 to 100 wt. %, more preferably from about 85 to about 100 wt. %, of the polytrimethylene ether glycol esters. The fluids may further comprise from about 1 wt. % to about 25 wt. %, preferably from about 5 wt. % to about 15 wt. %, of blending component comprising other insulating fluids such as vegetable oils, vegetable oil based fluids, mineral oil, synthetic esters, silicon fluids and poly alpha olefins, based on the total weight of the electrical insulation fluid. Vegetable oils and vegetable oil based fluids are highly preferred blending components. Examples of vegetable oils include but are not limited to sunflower oil, canola oil, rapeseed oil, corn oil, olive oil, soybean oil and castor oil. Examples of vegetable oil based fluids that can be used are Envirotemp® FR3™ fluid (Cooper Industries, Inc.) and BIOTEMP® Biodegradable Dielectric Insulating Fluid (ABB). An example of high fire point hydrocarbon oil that can be used is R-Temp® hydrocarbon oil (Cooper Industries, Inc.). Examples of synthetic esters include polyol esters. Commercially available synthetic esters that can be used include those sold under the trade names Midel® 7131 (The Micanite and Insulators Co., Manchester UK), REOLEC® 138 fluid (FMC, Manchester, UK), and ENVIROTEMP 200 fire-resistant fluid (Cooper Power Fluid Systems).

The electrical insulating fluids can contain other useful additives. Exemplary of the most typical types of additives are antioxidants, metal deactivators, in particular copper deactivators, corrosion inhibitors, flame retardants, and thermal stabilizers. Of lesser importance but sometimes desirable are viscosity modifiers, pour point depressants and anti foaming agents.

Stabilizers suitable for reducing the rate of thermal and oxidative degradation of the polytrimethylene ether glycol esters include phenolic compounds such as 2,2-di(4-hydroxyphenyl)propane, phenothiazine, 3,7-dioctyl phenothiazine, phenothiazine carboxylic acid esters, phenothiazines such as N-ethyl phenothiazine, N-phenyl phenothiazine, etc.; polymerized trimethyldihydroquinoline; amines, such as phenyl-α-naphthylamine, phenyl-β-naphthylamine, N,N'-dioctyldiphenylamine, N,N'-diphenyl-p-phenylene diamine, N,N'-di-β-naphthyl-p-phenylene diamine, p-isopropoxy diphenylamine, N,N'-dibutyl p-phenylene diamine, N,N'-bis (1,4-dimethylpentyl)-p-phenylenediamine, N,N'-diisopropyl-p-phenylenediamine, p-hydroxydiphenylamine, etc.; hindered phenols such as dibutyl cresol, 2,6-dimethyl-p-cresol, butylated 2,2-di-(4-hydroxyphenyl)propane, N-butylated aminophenol, etc.; butylated hydroxyanisoles, such as 2,6-dibutyl-p-hydroxyanisole, anthraquinone, dihydroxyanthraquinone, hydroquinone, 2,5-di-t-butylhydroquinone, 2-t-butylhydroquinone; quinoline; p-hydroxydiphenylamine, phenylbenzoate, p-hydroxyanisole, nordihydroguairetic acid; pyrocatechol; styrenated phenol; polyalkyl polyphenols; propyl gallate; sodium nitrite, etc. Mixtures of the above mentioned stabilizers may be employed if desired. Stabilizers which provide fluid with no more than trace amounts of varnishes and/or sludges as degradation products after 500 hours of continuous use at temperatures of about 260° C. preferably 290° C., are particularly desirable. Stabilizers selected from the group consisting of N,N'-diphenyl-p-phenylenediamine, phenothiazine, propyl gallate and 3,7-dioctylphenothiazine are particularly well suited for use herein. Stabilizer combinations of phenothiazine or 3,7-dioctylphenothiazine and at least one other antioxidant, preferably N,N'-diphenyl-p-phenylenediamine, are preferred.

Typically, oxidation/thermal stabilizers are used in the fluids of this invention in an amount of from about 0.1 wt. % to about 10 wt. %, based upon the weight of the fluid, and more preferably in an amount of from about 0.5 wt. % to about 5 wt. %. It is desirable for the stabilizer to have a solubility of at least 25 g/liter of the composition at 25° C.

Additives for corrosion control include steel corrosion inhibitors such as phosphate esters, dimer acid, alkyl succinic anhydride and the like, and copper corrosion inhibitors such as benzotriazole, tolyltriazole, mercaptobenzothiazole and the like. Borates, chromates, molybdates and tungstates have also been found to be useful. Anti-corrosion additives are preferably used in an amount of from about 0.05 wt. % to about 5 wt. %, and more preferably from about 0.05 wt. % to about 3% wt. % based on the weight of the electrical insulation fluid.

Since copper is almost always present in the electrical environment, another type of additive often used is copper deactivators. Copper deactivators such as benzotriazole derivatives are commercially available. The use of these deactivators in small amounts, such as below 1%, may be beneficial in reducing the catalytic activity of copper in electrical apparatus.

In addition to the additives listed above, the electrical insulation fluids of the invention can contain other additives, such as acid-base indicators and dyes, provided that the additives are soluble in the compositions, are thermally stable at high temperatures and do not deleteriously affect the electrical properties.

The electrical insulation fluids are suitable for use in any application requiring electrical insulation fluids having the properties of the fluids disclosed herein, such as liquid-filled power transformers, distribution transformers, traction transformers, reactors, and their accessory equipment such as switches and tap changers, all of which are fluid-filled. The combination of fluid and solid insulation such as kraft paper, kraft board, aramid paper, cotton paper, aramid board, or composites (i.e., fiber glass/epoxy, nylon, polyester), provides electrical insulation for the device. In addition, the fluid serves as a heat transfer medium to aid in cooling electrical devices.

The invention is illustrated in the following examples. All parts, percentages, etc., referred to in this application (including the examples) are by weight unless otherwise indicated.

EXAMPLES

The 1,3-propanediol utilized in the examples was prepared by biological methods and had a purity of >99.8%.

Example 1

1,3-propanediol (2.39 kg, 31.45 moles) was charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 12.1 g (0.5 wt %) of concentrated sulfuric acid was added. The reaction was allowed to proceed at 170° C. for 3 hours, and then the temperature was raised to 180° C. and held at 180° C. for 135 minutes. A total of 435 mL of distillate was collected. The reaction mixture was cooled, and then 2.19 kg (15.2 moles) of 2-ethylhexanoic acid (99%) was added. The reaction temperature was then raised to 160° C. under nitrogen flow with continuous agitation at 180 rpm and maintained at that temperature for 6 hours. During this period an additional 275 mL of distillate water was collected. Heating and agitation were stopped and the reaction mixture was allowed to cool.

2.5 kg of the polytrimethylene ether glycol ester product was mixed with 0.25 kg of water, and then the resulting mixture was heated at 100° C. for 6 hours. The aqueous phase was separated from the polymer phase, and then the polymer phase was mixed with 2.0 kg of 3.3 wt % Na2CO3 solutions at 50° C. Aqueous layer was removed after separation. The product was again washed with 2.0 kg of 3.3 wt % Na2CO3 solution and then with 1 L deionized water. The resulting product was dried at 120° C. for 3 h under reduced pressure.

The resulting ester product was analyzed using proton NMR. No peaks associated with sulfate esters and unreacted 2-ethylhexanoic acid was found. The calculated number average molecular weight was found to be 500.

The dielectric fluid properties of the material synthesized as in Example 1 appear in Table 1 below.

TABLE 1

Dielectric fluid Properties

| Property, Units | ASTM Method | Typical Value |
|---|---|---|
| Dielectric Breakdown Voltage, kV | D-877 | 32.3 |
| Dielectric Constant at ambient temp. | | |
| 1000 Hz | D-924 | 5.516 |
| 10,000 Hz | | 5.517 |
| Dissipation Factor at ambient temp. | | |
| 1000 Hz | D-924 | 0.0055 |
| 10,000 Hz | | 0.0005 |
| Thermal conductivity, watts/m °K | | |
| @ 38° C.(100° F.) | PLTL-73 | 0.150 |
| @ 66° C. (150 F) | | 0.142 |
| @ 93° C. (200° F.) | | 0.140 |
| Specific heat @ 100° C. | E-1269 | |
| Joules/g °K | | 2.277 |
| Cal/g ° C. | | 0.544 |
| Viscosity @ 40° C., cSt | | 20 |
| Density @ 40° C. | | 0.957 |
| Pour Point, ° C. | D-97 | −63 |
| Flash Point, ° C. | D-92 | 216 |
| Fire Pont, ° C. | D-92 | 232 |
| Surface Tension, dynes/cm | | 32.2 |

Example 2

1,3-propanediol (2.5 kg, 32.9 moles) was charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 15.12 g (0.5 wt %) of concentrated sulfuric acid was added. The reaction was allowed to proceed at 170° C. for 3 hours, and then the temperature was raised to 180° C. and held at 180° C. for 285 minutes. A total of 550 mL of distillate was collected. The reaction mixture was cooled, and then 0.9 kg (6.2 moles) of 2-ethylhexanoic acid (99%) was added. The reaction temperature was then raised to 160° C. under nitrogen flow with continuous agitation at 180 rpm and maintained at that temperature for 6 hours. During this period an additional 110 mL of distillate water was collected. Heating and agitation were stopped and the reaction mixture was allowed to cool.

2.0 kg of the polytrimethylene ether glycol ester product was mixed with 2 kg of water, and then the resulting mixture was heated at 95° C. for 6 hours. The aqueous phase was separated from the polymer phase, and then the polymer phase was washed twice with 2.0 kg of water. The resulting product was heated at 120° C. at 200 mTorr to remove volatiles (255 g).

To 1.5 kg of the obtained product 0.14 g of $Ca(OH)_2$ in 14 mL was added and heated at 70° C. for 3 h. The product was dried under reduced pressure at 110° C. for 2 h. The product was filtered. To the obtained product 1 L of 1 wt % $Na_2CO_3$ was added and the mixture was heated to 50° C. for 1 h. The product transferred into a separating funnel and allowed separate. Aqueous layer was removed and the product was washed with 1 L warm deionized water. The obtained product was dried at 90° C. using rotovap under reduced pressure and filtered using filtering aid celpure 65.

The resulting ester product was analyzed using proton NMR. No peaks associated with sulfate esters and unreacted 2-ethylhexanoic acid was found. The calculated number average molecular weight was found to be 835.

The dielectric fluid properties of the material synthesized as in Example 2 appear in Table 2 below.

TABLE 2

| Dielectric fluid Properties | | |
|---|---|---|
| Property, Units | ASTM Method | Typical Value |
| Dielectric Breakdown Voltage, kV | D-877 | 35 |
| Dielectric Constant at ambient temp | | |
| 1000 Hz | D-924 | 5.553 |
| 10,000 Hz | | 5.549 |
| Dissipation Factor at ambient temp. | | |
| 1000 Hz | D-924 | 0.0080 |
| 10,000 Hz | | 0.0008 |
| Viscosity @ 40° C., cSt | | 68 |
| Density @ 40° C. | | 0.9936 |
| Pour Point, ° C. | D-97 | −48 |
| Flash Point, ° C. | D-92 | 242 |
| Fire Pont, ° C. | D-92 | 266 |
| Surface Tension, dynes/cm | | 34.2 |

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. An electrical apparatus comprising an electrical insulation fluid comprising polytrimethylene ether glycol esters having a dielectric breakdown voltage equal or greater than about 30 Kv, and a dissipation factor of less than about 0.01 when measured at 1000 Hz at ambient temperature.

2. The electrical apparatus of claim 1 wherein the polytrimethylene ether glycol esters have a number average molecular weight of from about 250 to about 5000.

3. The electrical apparatus of claim 1 wherein the electrical insulation fluid further comprises a blending component selected from the group consisting of vegetable oil, polytrimethylene ether glycols, mineral oil, synthetic esters and poly alpha olefins.

4. The electrical apparatus of claim 3 wherein the electrical insulation fluid comprises from about 50 wt. % to about 99 wt. % polytrimethylene ether glycol ester and about 1 wt. % to about 50 wt. % of the blending component, based on the weight of the electrical insulating fluid.

5. The electrical apparatus of claim 1 wherein the electrical insulation fluid has flash and fire points greater than about 150° C.

6. The electrical apparatus of claim 1 wherein the electrical insulation fluid has a kinematic viscosity at 40° C. from about 5 centistokes to 100 centistokes and pour point below −20° C.

7. The electrical apparatus of claim 1 wherein the polytrimethylene ether glycol esters are produced from ingredients comprising 1,3-propanediol derived from a fermentation process using a renewable biological source.

8. The electrical apparatus of claim 1 wherein the electrical insulation fluid further comprises at least one additive selected from the group consisting of oxidation inhibitors, corrosion inhibitors, metal deactivators, flame retardants and lubricity enhancing agents.

9. The electrical apparatus of claim 8 wherein the oxidation inhibitor comprises at least one compound selected from the group consisting of hindered phenols, phenolic esters, alkylated diphenylamines and mixtures thereof.

10. The electrical apparatus of claim 1 selected from the group consisting of electrical transformers, capacitors, fluid-filled transmission lines and fluid-filled power cables.

11. A device containing an electrical insulation fluid comprising (a) polytrimethylene ether glycol esters and (b) a blending component selected from the group consisting of vegetable oils, polytrimethylene ether glycols, mineral oil, poly alpha olefins, synthetic esters, and mixtures thereof, wherein the electrical insulation fluid has a dielectric breakdown voltage of equal or greater than about 30 kV.

12. A device of claim 11, selected from the group consisting of:

liquid-filled power transformers, distribution transformers, traction transformers, reactors, and their accessory equipment such as switches and tap changers.

* * * * *